(12) United States Patent
Khosravi et al.

(10) Patent No.: US 10,390,222 B2
(45) Date of Patent: Aug. 20, 2019

(54) TECHNOLOGIES FOR TOUCH-FREE MULTI-FACTOR AUTHENTICATION

(71) Applicant: Intel Corporation, Santa Clara, CA (US)

(72) Inventors: Hormuzd M. Khosravi, Portland, OR (US); David A. Bronleewe, Hillsboro, OR (US); Khaled Almahallawy, Hillsboro, OR (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,903

(22) Filed: Sep. 26, 2015

(65) Prior Publication Data

US 2017/0094510 A1 Mar. 30, 2017

(51) Int. Cl.
*H04L 29/06* (2006.01)
*H04W 12/06* (2009.01)
(Continued)

(52) U.S. Cl.
CPC ............ *H04W 12/06* (2013.01); *G06F 21/32* (2013.01); *G06F 21/72* (2013.01); *G06F 21/78* (2013.01);
(Continued)

(58) Field of Classification Search
CPC ...... H04W 12/06; H04W 12/08; H04L 63/04; H04L 63/0861; G06F 21/32
See application file for complete search history.

(56) References Cited

U.S. PATENT DOCUMENTS 7,587,611 B2 9/2009 Johnson
8,594,628 B1 * 11/2013 Schroeder ........... H04L 63/0846
370/331
(Continued)

OTHER PUBLICATIONS

International Search Report for PCT/US16/048955, dated Dec. 2, 2016 (5 pages).
(Continued)

*Primary Examiner* — Dao Q Ho
(74) *Attorney, Agent, or Firm* — Barnes & Thornburg LLP

(57) ABSTRACT

Technologies for authenticating a user and a mobile computing device of the user at an authentication computing device include generating, at the authentication computing device, a multi-factor authentication credential that includes a text-based credential and a plurality of biometric authentication factors corresponding to the user. The mobile computing device is configured to detect whether the authentication computing device is within proximity of the mobile computing device and establish a secure communication channel therebetween. The mobile computing device is further configured to securely store the multi-factor authentication credential received from the authentication computing device. The authentication computing device is configured to receive the multi-factor authentication credential from the mobile computing device and analyze the received multi-factor authentication credential to determine whether the user is an authorized user of the authentication computing device and take an action based on a result of the analysis. Other embodiments are described and claimed.

19 Claims, 7 Drawing Sheets

(51) Int. Cl.
*G06F 21/32* (2013.01)
*G06F 21/72* (2013.01)
*G06F 21/78* (2013.01)

(52) U.S. Cl.
CPC ......... *H04L 63/04* (2013.01); *H04W 12/0608* (2019.01); *H04L 63/0428* (2013.01); *H04L 63/0861* (2013.01); *H04L 2463/082* (2013.01)

(56) References Cited

U.S. PATENT DOCUMENTS

| | | | |
|---|---|---|---|
| 2005/0228993 A1* | 10/2005 | Silvester | G06F 21/32 713/168 |
| 2007/0015463 A1 | 1/2007 | Abel | |
| 2010/0048173 A1 | 2/2010 | Ross | |
| 2012/0045060 A1* | 2/2012 | Maestrini | H04L 63/08 380/274 |
| 2012/0240195 A1* | 9/2012 | Weiss | H04L 63/0846 726/4 |
| 2012/0249292 A1 | 10/2012 | Wong | |
| 2013/0174241 A1* | 7/2013 | Cha | H04L 63/0815 726/7 |

OTHER PUBLICATIONS

Written Opinion for PCT/US16/048955, dated Dec. 2, 2016 (6 pages).

\* cited by examiner

TECHNOLOGIES FOR TOUCH-FREE MULTI-FACTOR AUTHENTICATION

BACKGROUND

Some facilities or computing devices may require an authentication to be performed prior to allowing access to a user. For example, some facilities may employ an access control system to perform an authentication of the user to determine whether access to a room, floor, or hallway in the facility should be granted. To do so, the access control system generally relies on the user presenting a smart card at a reader. The reader may then compare credentials from the smart card to a local database and/or an external database stored at a remote server. If the credentials match, the reader may then trigger a lock mechanism to release, allowing access to the user. Similarly, a computing device (e.g., smartphone, laptop, desktop, etc.) may also require an authentication to be performed prior to allowing access to a user of the computer.

Some computing devices may require several different credentials to perform user authentication (e.g., multi-factor authentication). Such multi-factor authentication may require one or more text-based user credentials (e.g., password, passphrase, etc.), biometric authentication factors (e.g., fingerprint, facial, voice, and/or retina scanning), security tokens, and/or other technical authentication measures to determine whether access should be granted. For example, a computing device may require a password and a fingerprint, or passphrase, facial recognition, and a retinal scan, or any combination of biometric authentication factors that result in more than one biometric authentication factor being used. However, many of these authentication methods may be compromised by theft. Additionally, in some environments (e.g., a healthcare facility), different computing devices may require different credentials. As such, the user may be required to recall a number of different credentials and/or provide different biometrics to the different computing devices throughout a given period of time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
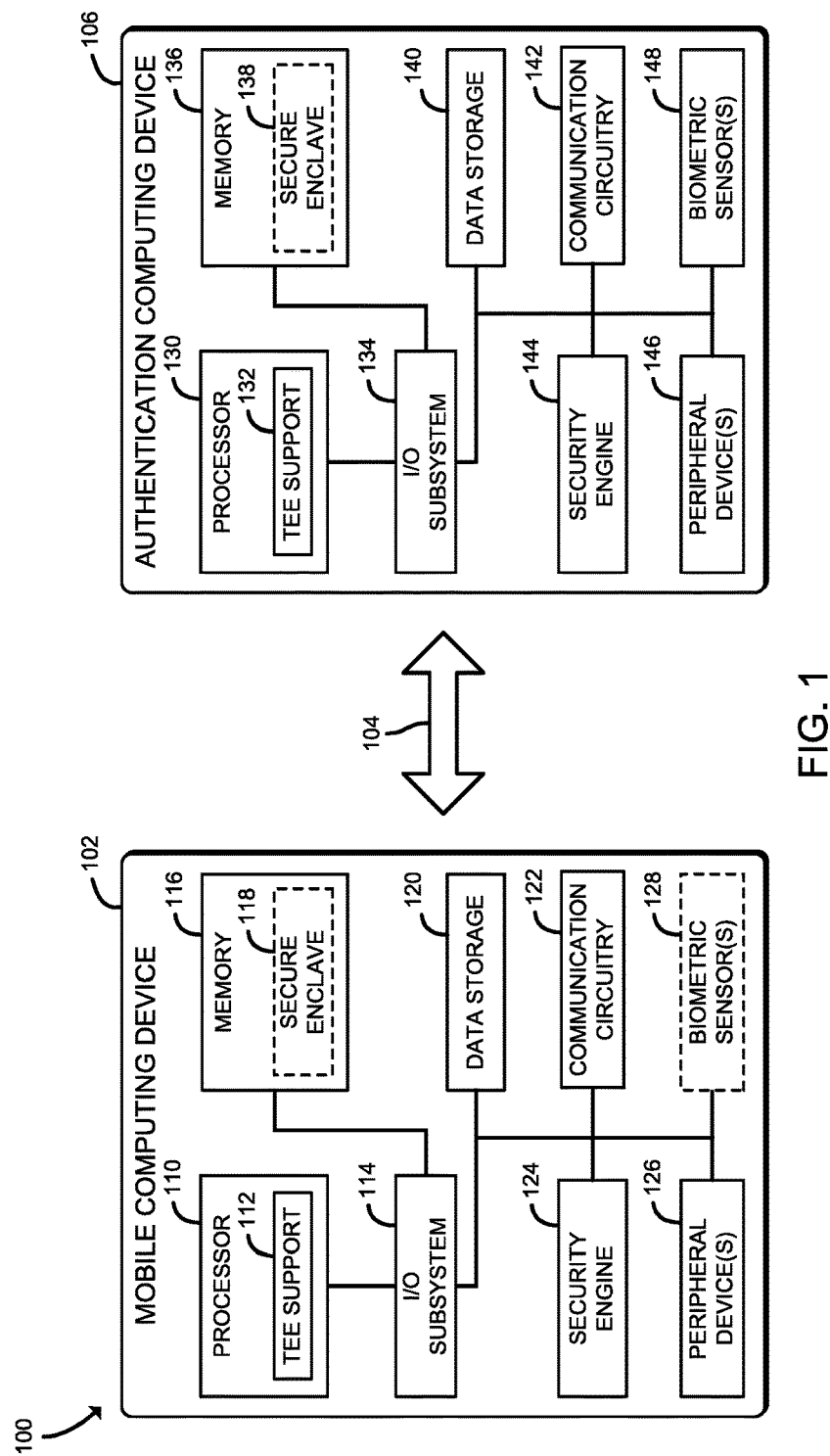
FIG. 1 is a simplified block diagram of at least one embodiment of a system for touch-free multi-factor authentication that includes a mobile computing device communicatively coupled to an authentication computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for touch-free multi-factor authentication includes a mobile computing device 102 communicatively coupled to an authentication computing device 106 via a short-range wireless connection 104. In use, a user wears, carries, or otherwise transports the mobile computing device 102 on their person. Upon coming into a proximate range of the authentication computing device 106, the mobile computing device 102 detects and connects to the authentication computing device 106, such as by using a short-range wireless technology. After having connected to the authentication computing device 106, the mobile computing device 102 may establish a secure communication channel to securely transmit data therebetween.

In use, the authentication computing device 106 is configured to perform an enrollment of the user and/or the mobile computing device 102. To do so, the authentication computing device 106 is configured to interface with the user to capture two or more credentials (i.e., a multi-factor authentication credential), such a text-based credential (e.g., a password, a passphrase, etc.) and a biometric authentication factor (e.g., a fingerprint scan, a facial scan, a voice capture, a retina scan, etc.), which may be associated with a username of the user. The authentication computing device 106 subsequently stores the multi-factor authentication credential in a secure storage location of the authentication computing device 106. Prior to storing the multi-factor authentication credential, the authentication computing device 106 is configured to encrypt the multi-factor authentication credential (i.e., store an encrypted multi-factor authentication) to provide an additional layer of security.

In some embodiments, the authentication computing device 106 may then transmit the encrypted multi-factor authentication credential to the mobile computing device 102, which the mobile computing device 102 is configured to store in a secure storage location. Alternatively, in some embodiments, the mobile computing device 102 may be similarly configured to interface with the user to capture another multi-factor authentication credential (i.e., of the same type as captured during enrollment with the authentication computing device 106) corresponding to the user.

Accordingly, in either of the embodiments, subsequent interactions with the authentication computing device 106 may be managed touch-free. In other words, the presence of the authentication computing device 106 in communicative proximity to the mobile computing device 102 may establish another secure communication channel in which the mobile computing device 102 can transmit the multi-factor authentication credential (i.e., received from the authentication computing device 106 or captured by the mobile computing device 102) to the authentication computing device 106, which the authentication computing device 106 may then analyze to determine whether the user (i.e., the mobile computing device 102) is an authorized user without physical interaction with the authentication computing device 106 by the user.

The mobile computing device 102 may be embodied as any type of computing device that is capable of performing the functions described herein, such as, without limitation, a portable computing device (e.g., smartphone, tablet, laptop, notebook, wearable, etc.) that includes mobile hardware (e.g., processor, memory, storage, wireless communication circuitry, etc.) and software (e.g., an operating system) to support a mobile architecture and portability. The illustrative mobile computing device 102 includes a processor 110, an input/output (I/O) subsystem 114, a memory 116, a data storage device 120, communication circuitry 122, a security engine 124, and one or more peripheral devices 126, as well as, in some embodiments, one or more biometric sensors 128.

Of course, the mobile computing device 102 may include other or additional components, such as those commonly found in a computing device, in other embodiments. Additionally, in some embodiments, one or more of the illustrative components may be incorporated in, or otherwise form a portion of, another component. For example, the memory 116, or portions thereof, may be incorporated in the processor 110 in some embodiments. Further, in some embodiments, one or more of the illustrative components may be omitted from the mobile computing device 102.

The processor 110 may be embodied as any type of processor capable of performing the functions described herein. The processor 110 may be embodied as a single or multi-core processor(s), digital signal processor, microcontroller, or other processor or processing/controlling circuit. The illustrative processor 110 includes trusted execution environment (TEE) support 112. The TEE support 112 allows the processor 110 to establish a software execution environment in which executing code may be measured, verified, or otherwise determined to be authentic.

Additionally, code and data included in the software TEE may be encrypted or otherwise protected from being accessed by code executing outside of the software TEE. In some embodiments, the TEE support 112 may be embodied as Intel® Software Guard Extensions (SGX) technology. Intel® SGX technology may be embodied as a set of processor instruction extensions that allow the processor 110 to establish one or more secure enclaves in the memory 116, which may be embodied as regions of memory including software that are isolated from other software executed by the processor 110.

The memory 116 may be embodied as any type of volatile or non-volatile memory or data storage capable of performing the functions described herein. In operation, the memory 116 may store various data and software used during operation of the mobile computing device 102, such as operating systems, applications, programs, libraries, and drivers. In some embodiments, the memory 116 may include one or more secure enclaves 118 (i.e., software isolation trusted execution environments (TEEs)). Each secure enclave 118 may be embodied as a protected region of the memory 116. Each secure enclave 118 may include code and data that is measured, validated, or otherwise authenticated.

Similar to the TEE, the contents of the secure enclave 118 may be protected from access by software executing outside of the same secure enclave 118. The contents of each secure enclave 118 may be protected from access and/or tampering using any combination of hardware protection and/or cryptographic protection. For example, each secure enclave 118 may be embodied as a secure enclave created and otherwise managed using Intel® SGX technology. In some embodiments, a part of or the entirety of the secure enclave 118 may be stored in a specialized memory structure such as an enclave page cache (EPC).

The memory 116 is communicatively coupled to the processor 110 via the I/O subsystem 114, which may be embodied as circuitry and/or components to facilitate input/output operations with the processor 110, the memory 116, and other components of the mobile computing device 102. For example, the I/O subsystem 114 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 110, the memory 116, and other components of the mobile computing device 102, on a single integrated circuit chip.

The data storage device 120 may be embodied as any type of device or devices configured for short-term or long-term storage of data such as, for example, memory devices and circuits, memory cards, hard disk drives, solid-state drives, or other data storage devices. It should be appreciated that the data storage device 120 and/or the memory 116 (e.g., the computer-readable storage media) may store various data as described herein, including operating systems, applications, programs, libraries, drivers, instructions, etc., capable of being executed by a processor (e.g., the processor 110) of the mobile computing device 102.

The communication circuitry 122 may be embodied as any communication circuit, device, or collection thereof, capable of enabling communications between the mobile computing device 102 and other computing devices (e.g., the authentication computing device 106) over a short-range wireless connection (e.g., the short-range wireless connection 104). The communication circuitry 122 may be configured to use any one or more short-range wireless communication technologies and associated protocols (e.g., Bluetooth®, Bluetooth® Low Energy (BLE), near-field communication (NFC), and/or any other short-ranged wireless communication protocol) to effect such communication. The communication circuitry 122 may be additionally configured to use any one or more other communication technologies (e.g., wireless or wired communication technologies) and associated protocols (e.g., Ethernet, Wi-Fi®, WiMAX, LTE, 5G, etc.) to effect communication with other computing devices, such as over a network, for example.

The security engine 124 may be embodied as any hardware component(s) or circuitry capable of establishing a trusted execution environment (TEE) on the mobile computing device 102. In particular, the security engine 124 may support executing code and/or accessing data that is independent and secure from other code executed by the mobile computing device 102. The security engine 124 may be embodied as a Trusted Platform Module (TPM), a manageability engine (ME), an out-of-band processor, or other security engine device or collection of devices. In some embodiments the security engine 124 may be embodied as a converged security and manageability engine (CSME) incorporated in a system-on-a-chip (SoC) of the mobile computing device 102. Further, in some embodiments, the security engine 124 may also be capable of communicating using the communication circuitry 122 and/or a dedicated communication circuit independently of the state of the mobile computing device 102 (e.g., independently of the state of the processor 110), also known as "out-of-band" communication.

The peripheral devices 126 may include any number of input/output devices, interface devices, and/or other peripheral devices. For example, in some embodiments, the peripheral devices 126 may include a display, a touch screen, graphics circuitry, a keyboard, a mouse, a microphone, a speaker, and/or other input/output devices, interface devices, and/or peripheral devices. The particular devices included in the peripheral devices 126 may depend on, for example, the type and/or intended use of the mobile computing device 102. The peripheral devices 126 may additionally or alternatively include one or more ports, such as a USB port, for example, for connecting external peripheral devices to the mobile computing device 102.

The biometric sensors 128 may be embodied as any sensor(s) capable of measuring a physiological attribute of the user of the mobile computing device 102. The biometric sensors 128 may be integrated with or otherwise used by an authentication subsystem of the mobile computing device 102. The biometric sensors 128 may be embodied as or otherwise include, for example, a fingerprint scanner, a retina scanner, a facial recognition scanner, a voice recognition scanner, and/or any other type of biometric feedback sensor which are not shown in FIG. 1 to preserve clarity of the description.

The authentication computing device 106 may be embodied as any type of computation or computing device capable of performing the functions described herein, including, without limitation, a computer, a mobile computing device (e.g., smartphone, tablet, laptop, notebook, wearable, etc.), a server (e.g., stand-alone, rack-mounted, blade, etc.), a network appliance (e.g., physical or virtual), a web appliance, a distributed computing system, a processor-based system, and/or a multiprocessor system. Similar to the illustrative mobile computing device 102, the authentication computing device 106 includes a processor 130 with TEE support 132, an I/O subsystem 134, a memory 136 that may include a secure enclave, a data storage device 140, communication circuitry 142, a security engine 144, one or more biometric sensors 148, and one or more peripheral devices 146. As such, further descriptions of the like components are not repeated herein with the understanding that the description of the corresponding components provided above in regard to the mobile computing device 102 applies equally to the corresponding components of the authentication computing device 106.

Figure 2:
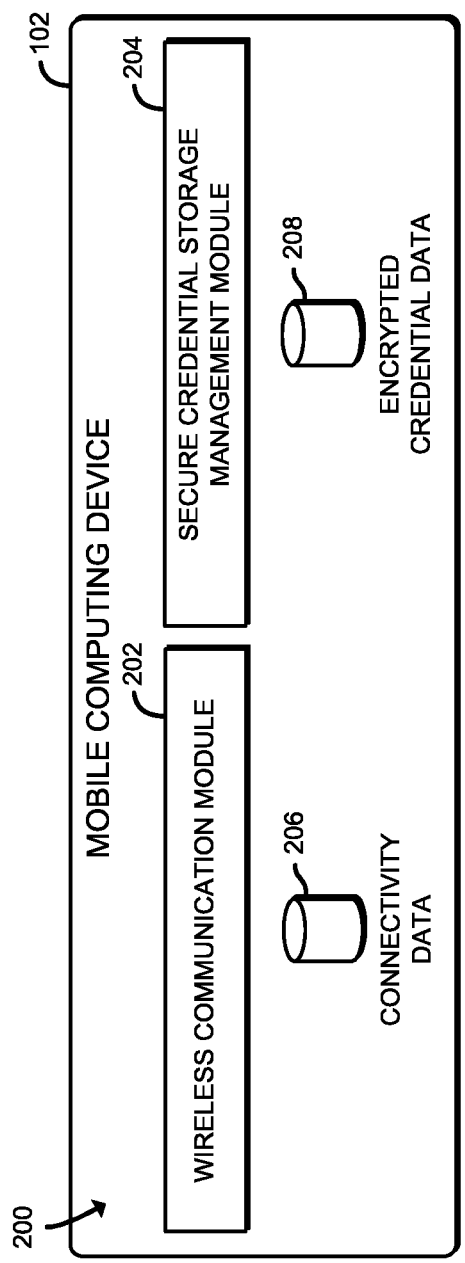
FIG. 2 is a simplified block diagram of at least one embodiment of an environment that may be established by the mobile computing device of the system of FIG. 1.

Referring now to FIG. 2, in an illustrative embodiment, the mobile computing device 102 establishes an environment 200 during operation. The illustrative environment 200 includes a wireless communication module 202 and a secure credential storage management module 204. Each of the modules, logic, and other components of the environment 200 may be embodied as hardware, software, firmware, or a combination thereof. For example, each of the modules, logic, and other components of the environment 200 may form a portion of, or otherwise be established by, the processor 110, the memory 116, the communication circuitry 122, and/or other hardware components of the mobile computing device 102. As such, in some embodiments, one or more of the modules of the environment 200 may be embodied as circuitry or a collection of electrical devices (e.g., wireless communication circuitry 202, secure credential storage management circuitry 204, etc.).

In the illustrative environment 200, the mobile computing device 102 includes connectivity data 206 and encrypted credential data 208, each of which may be accessed by the various modules and/or sub-modules of the mobile computing device 102. It should be appreciated that the mobile computing device 102 may include other components, sub-components, modules, sub-modules, and/or devices commonly found in a computing node, which are not illustrated in FIG. 2 for clarity of the description.

The wireless communication module 202 is configured to facilitate inbound and outbound wireless communications (e.g., network traffic, network packets, network flows, etc.) to and from the mobile computing device 102. To do so, the wireless communication module 202 is configured to receive and process network packets from other computing devices (e.g., the authentication computing device 106 and/or other computing device(s) communicatively coupled to the mobile computing device 102). Additionally, the wireless communication module 202 is configured to prepare and transmit network packets to another computing device (e.g., the authentication computing device 106 and/or other computing device(s) communicatively coupled to the mobile computing device 102).

To do so, the wireless communication module 202 is further configured to establish a secure communication channel with the computing devices with which the mobile computing device 102 is wirelessly coupled. Accordingly, in some embodiments, at least a portion of the functionality of the wireless communication module 202 may be performed by the communication circuitry 122 of the mobile computing device 102 (e.g., a network interface controller (NIC)). In some embodiments, data used to wirelessly couple to the other computing devices (e.g., Bluetooth® pair credentials, an identifier of the computing device, etc.) may be stored in the connectivity data 206 and retrieved for future coupling attempts with the other computing devices.

The secure credential storage management module 204 is configured to manage the storage of credential data (i.e., encrypted multi-factor authentication credentials). In other words, the secure credential storage management module 204 is configured to store and retrieve the encrypted multi-factor authentication credentials. In some embodiments, the encrypted multi-factor authentication credentials may be stored in a secure location (e.g., in a secure enclave 118 of the memory 116), such as the encrypted credential data 208. As described previously, in some embodiments, the encrypted multi-factor authentication credentials may be received from the authentication computing device 106. Alternatively, in some embodiments the encrypted multi-factor authentication credentials may be generated by the mobile computing device 102 (i.e., using the biometric sensors 128 of the mobile computing device 102 of FIG. 1). In such embodiments, the mobile computing device 102 may include one or more additional modules similar to those shown in the illustrative TEE 112 of FIG. 3 to generate and encrypt the multi-factor authentication credentials, which are described in detail below.

Figure 3:
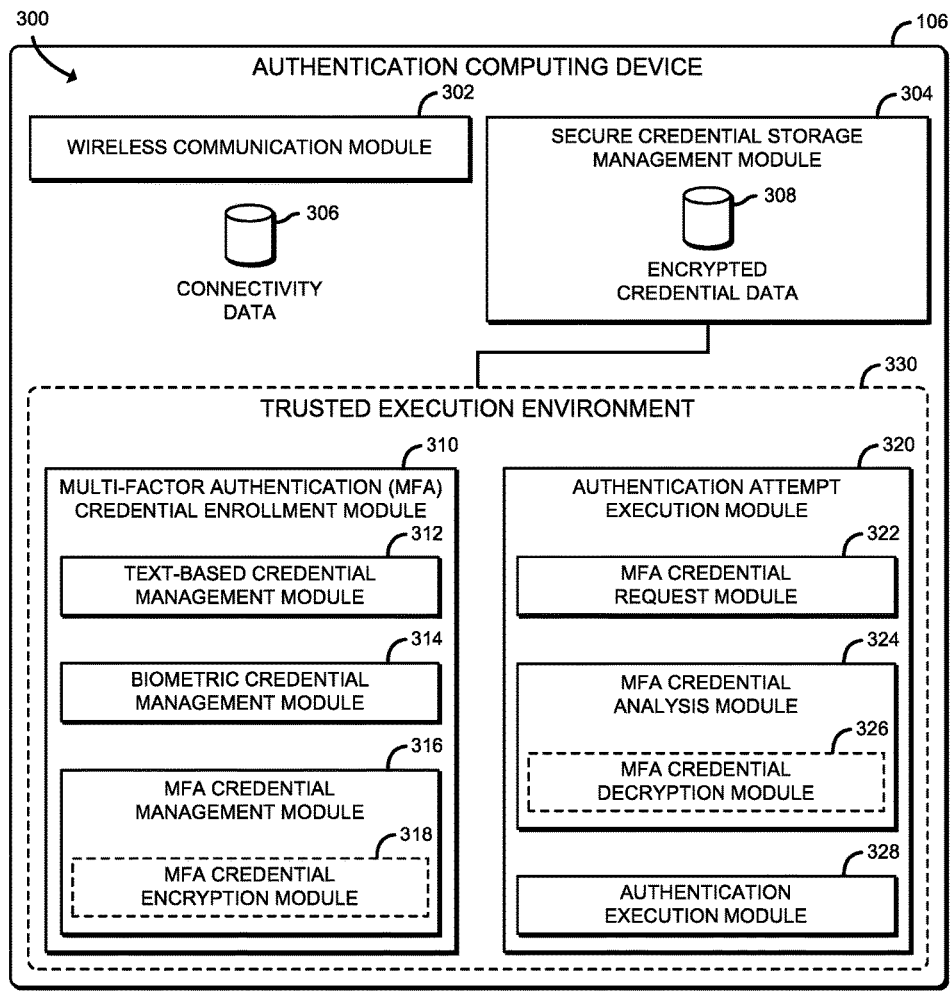
FIG. 3 is a simplified block diagram of at least one embodiment of an environment that may be established by the authentication computing device of the system of FIG. 1.

Referring now to FIG. 3, in an illustrative embodiment, the authentication computing device 106 establishes an environment 300 during operation. The illustrative environment 300 includes, similar to the illustrative mobile computing device 102 of FIG. 2, a wireless communication module 302 and a secure credential storage management module 304, as well as a multi-factor authentication credential enrollment module 310 and an authentication attempt execution module 320.

Each of the modules, logic, and other components of the environment 300 may be embodied as hardware, software, firmware, or a combination thereof. For example, each of the modules, logic, and other components of the environment 300 may form a portion of, or otherwise be established by, the processor 130, the memory 136, the communication circuitry 142, and/or other hardware components of the authentication computing device 106. As such, in some embodiments, one or more of the modules of the environment 300 may be embodied as circuitry or a collection of electrical devices (e.g., wireless communication circuitry 302, secure credential storage management circuitry 304, multi-factor authentication credential enrollment circuitry 310, authentication attempt execution circuitry 320, etc.).

In the illustrative environment 300, the authentication computing device 106, also similar to the illustrative mobile computing device 102 of FIG. 2, includes connectivity data 306 and encrypted credential data 308, each of which may be accessed by the various modules and/or sub-modules of the authentication computing device 106. It should be appreciated that the authentication computing device 106 may include other components, sub-components, modules, sub-modules, and/or devices commonly found in a computing node, which are not illustrated in FIG. 3 for clarity of the description.

The wireless communication module 302 is configured to facilitate inbound and outbound wireless communications (e.g., network traffic, network packets, network flows, etc.) to and from the authentication computing device 106. To do so, the wireless communication module 302 is configured to receive and process network packets from other computing devices (e.g., the mobile computing device 102 and/or other computing device(s) communicatively coupled to the authentication computing device 106). Additionally, the wireless communication module 302 is configured to prepare and transmit network packets to another computing device (e.g., the mobile computing device 102 and/or other computing device(s) communicatively coupled to the authentication computing device 106).

To do so, the wireless communication module 302 is further configured to establish a secure communication channel with the computing devices with which the authentication computing device 106 is wirelessly coupled to. Accordingly, in some embodiments, at least a portion of the functionality of the wireless communication module 302 may be performed by the communication circuitry 142 of the authentication computing device 106 (e.g., a network interface controller (NIC)). In some embodiments, data used to wirelessly couple to the other computing devices (e.g., Bluetooth® pair credentials, an identifier of the computing device, etc.) may be stored in the connectivity data 306 and retrieved for future coupling attempts with the other computing devices. Additionally, in some embodiments, the wireless communication module 302 is configured to monitor for the presence of the mobile computing device 102. Accordingly, it should be appreciated that the communication technology (e.g., Bluetooth®) employed by the authentication computing device 106, as well as the mobile computing device 102, may dictate the proximity in which the mobile computing device 102 can establish the secure connection with the authentication computing device 106.

Similar to the secure credential storage management module 204 of the mobile computing device 102, the secure credential storage management module 304 is configured to manage the storage of credential data (i.e., encrypted multi-factor authentication credentials). In other words, the secure credential storage management module 304 is configured to store and retrieve the encrypted multi-factor authentication credentials. In some embodiments, the encrypted multi-factor authentication credentials may be stored in a secure location (e.g., in a secure enclave 138 of the memory 136), such as the encrypted credential data 308.

The multi-factor authentication credential enrollment module 310 is configured to receive an enrollment request and enroll a user (i.e., a mobile computing device 102 of the user) with the authentication computing device 106 such that the mobile computing device 102 is usable to login to the authentication computing device 106 without interfacing directly with the authentication computing device 106 on future login attempts (e.g., without physical interaction with the authentication computing device 106). To do so, the multi-factor authentication credential enrollment module 310 includes a text-based credential management module 312, a biometric credential management module 314, and a multi-factor authentication credential management module 316.

The text-based credential management module 312 is configured to interface with the user and request the user enter their text-based credentials. For example, the text-based credential management module 312 may be configured to prompt the user (e.g., via a dialog prompt displayed on a display of the authentication computing device 106) to enter their username and a password or passphrase. The text-based credential management module 312 is further configured to verify the received text-based credentials, such as against a known username and password/passphrase of the user stored local to the authentication computing device 106 or a remote authentication server (not shown) external to the authentication computing device 106.

The biometric credential management module 314 is configured to interface with the user and request the user provide a biometric authentication factor, such as may be received via a fingerprint scan, a retinal scan, a facial scan, a voice recording, etc. For example, the biometric credential management module 314 may be configured to prompt the user (e.g., via a dialog prompt displayed on a display of the authentication computing device 106) to position a part of their person (e.g., their face for a facial scan or retinal scan, their mouth for a voice recording, their finger for a fingerprint scan, etc.) to a position accessible by one of the biometric sensors 148 of the authentication computing device 106.

The multi-factor authentication credential management module 316 is configured to bundle (i.e., group) the received text-based credentials and the biometric authentication factor(s) into a multi-factor authentication credential. The multi-factor authentication credential encryption module 318 is configured to encrypt the multi-factor authentication credential grouped by the multi-factor authentication credential management module 316. To do so, in some embodiments, the multi-factor authentication credential encryption module 318 may include a multi-factor authentication credential encryption module 318 to encrypt the multi-factor authentication credential. Additionally, the multi-factor authentication credential management module 316 is configured to store the encrypted multi-factor authentication credential in a secure storage of the authentication computing device 106, such as the encrypted credential data 308.

The authentication attempt execution module 320 is configured to perform a user authentication based on a multi-factor authentication credential received from the mobile computing device 102 communicatively coupled to the authentication computing device 106. To do so, the authentication attempt execution module 320 includes a multi-factor authentication credential request module 322, a multi-factor authentication credential analysis module 324, and an authentication execution module 328. The multi-factor authentication credential request module 322 is configured to transmit a multi-factor authentication credential request to the mobile computing device 102 and receive a multi-factor authentication credential from the mobile computing device 102 in response to the multi-factor authentication credential request.

The multi-factor authentication credential analysis module 324 is configured to analyze a received multi-factor authentication credential (e.g., the multi-factor authentication credential received by the multi-factor authentication credential request module 322) to determine whether the received multi-factor authentication credential corresponds to an authorized user, as described below. As described previously, the multi-factor authentication credential may be encrypted. Accordingly, the multi-factor authentication credential analysis module 324 may be further configured to decrypt the encrypted multi-factor authentication credential. To do so, in some embodiments, the authentication attempt execution module 320 may include a multi-factor authentication credential decryption module 326 configured to decrypt the encrypted multi-factor authentication credential.

To analyze the multi-factor authentication credential, the multi-factor authentication credential analysis module 324 is further configured to compare the received multi-factor authentication credential to a biometric authentication portion of another multi-factor authentication credential of the user upon having received the multi-factor authentication credential from the mobile computing device 102. To do so, the multi-factor authentication credential analysis module 324 is further configured to prompt the user to provide the biometric authentication factor(s) associated with the received multi-factor authentication credential. For example, if the user enrolled the mobile computing device using a facial scanner to record a facial scan authentication factor, the multi-factor authentication credential analysis module 324 would prompt the user to record another facial scan authentication factor for which to compare against that portion of the received multi-factor authentication credential.

In some embodiments, to provide an additional layer of security, the multi-factor authentication credential analysis module 324 may be configured to retrieve a known authorized multi-factor authentication credential of the user from a secure storage location. In such embodiments, the known authorized multi-factor authentication credential may be stored local to the authentication computing device 106. Alternatively, in some embodiments, the multi-factor authentication credential analysis module 324 may be configured to communicate (e.g., wired or wirelessly via a network (not shown)) with an external computing device at which the known authorized multi-factor authentication credential may be securely stored and retrieved therefrom.

The authentication execution module 328 is configured to take an action based on the analysis of the received multi-factor authentication credential. For example, if the analysis resulted in a confirmation that the received multi-factor authentication credential belonged to the user requesting access, the authentication execution module 328 may be configured to allow access to at least a portion of the authentication computing device 106. In another example, if the analysis resulted in a rejection (i.e., the received multi-factor authentication credential did not belong to the user requesting access), the authentication execution module 328 may be configured to deny the user access to the authentication computing device 106. Additionally, in some embodiments, the authentication computing device 106 may request manual entry (i.e., physical input by the user) of the multi-factor authentication credential by the user before determining whether to take further action (e.g., notify an administrator of a failed access, lock the user out of the authentication computing device 106, etc.).

In some embodiments, the illustrative environment 300 may include a trusted execution environment 330, such as may be established within a secure enclave 138 of the memory 136 of the authentication computing device 106. As shown, the TEE 330 may be implemented to execute the multi-factor authentication credential enrollment module 310 and/or the authentication attempt execution module 320 in a protected environment. It should be appreciated that additional and/or alternative operations may be performed within the TEE 330, such as the secure credential storage and retrieval from the encrypted credential data 308, for example.

Figure 4:
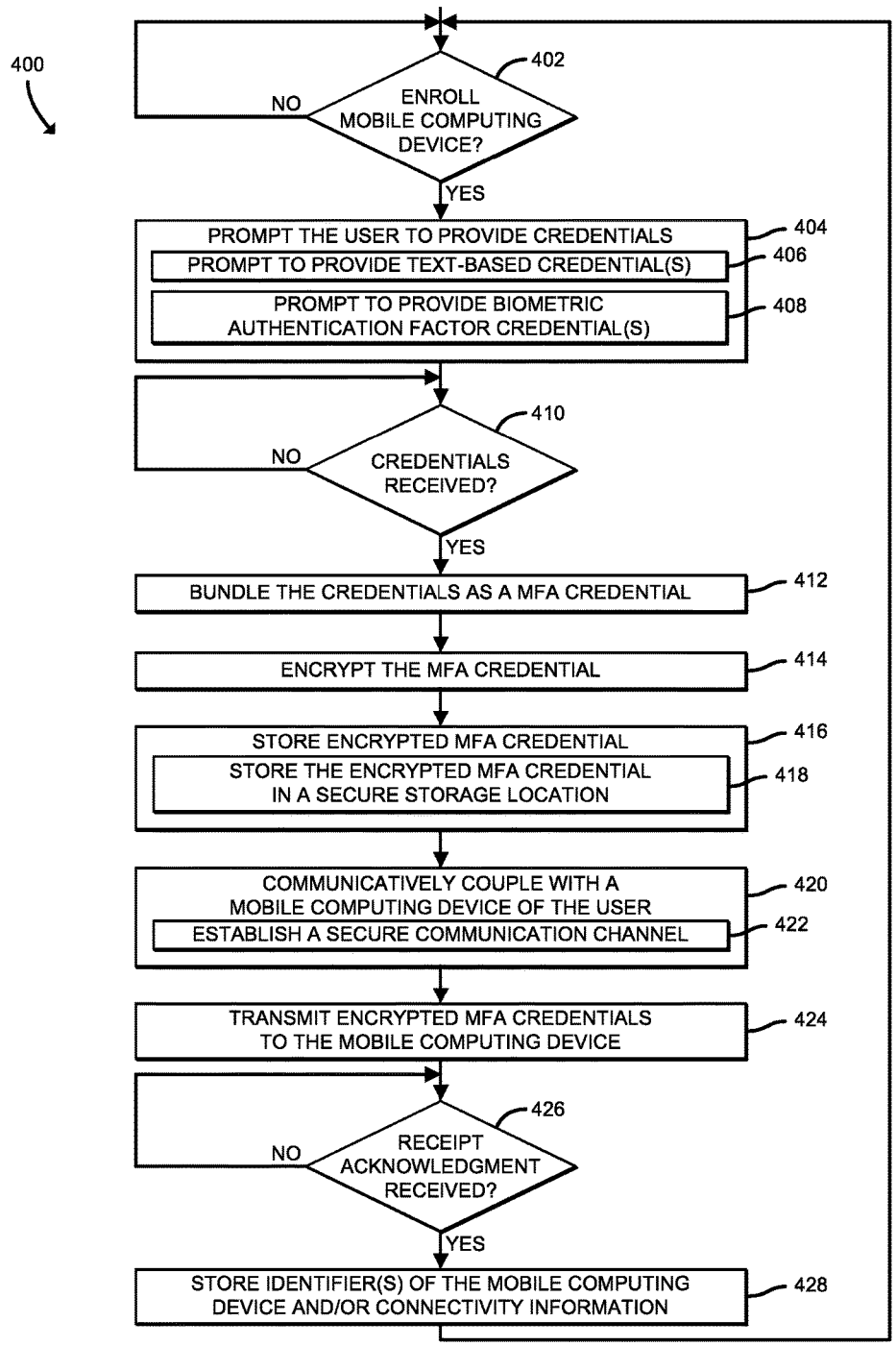
FIG. 4 is a simplified flow diagram of at least one embodiment of a method for enrolling the mobile computing device of FIGS. 1 and 2 with the authentication computing device of FIGS. 1 and 3 to enable touch-free multi-factor authentication that may be executed by the authentication computing device of FIGS. 1 and 3.

Referring now to FIG. 4, in use, the authentication computing device 106 may execute a method 400 for enrolling a user to enable touch-free multi-factor authentication at the authentication computing device 106. The method 400 begins with block 402, in which the authentication computing device 106 determines whether a user has initiated enrollment of a mobile computing device (e.g., the mobile computing device 102 of FIG. 1) of the user. In some embodiments, the enrollment may be initiated by the user interfacing via one or more I/O devices (e.g., a keyboard and a display) of the authentication computing device 106, such as may be used to login or execute a particular application on the authentication computing device 106.

If the enrollment was not initiated, the method 400 loops back to block 402 to continue to monitoring for an enrollment initiation. Otherwise, if the enrollment was initiated, the method 400 advances to block 404. In block 404, the authentication computing device 106 prompts the user to provide a set of credentials. In block 406, the authentication computing device 106 prompts the user to provide one or more text-based credentials, such as a username and a corresponding password or passphrase that can be manually entered at the authentication computing device 106 to allow the user access to the authentication computing device 106. In block 408, the authentication computing device 106 prompts the user to provide one or more biometric authentication factors, such as a fingerprint authentication factor, a retina authentication factor, a facial recognition authentication factor, a voice recognition authentication factor, etc., via the one or more biometric sensors (e.g., the biometric sensors 148 of FIG. 1) of the authentication computing device 106.

In block 410, the authentication computing device 106 determines whether the credentials were received (i.e., input, as a result of a scan, etc.) from the user. If so, in block 412, the authentication computing device 106 bundles the credentials (i.e., the text-based credentials and the biometric authentication factor credentials received in block 410) into a multi-factor authentication credential. In block 414, the authentication computing device 106 encrypts the multi-factor authentication credential. Subsequently, in block 416, the authentication computing device 106 stores the encrypted multi-factor authentication credential. For example, in block 418, the authentication computing device 106 may store the encrypted multi-factor authentication credential in a secure storage of the authentication computing device 106.

After the encrypted multi-factor authentication credential has been stored, the authentication computing device 106 communicatively couples with a mobile computing device (e.g., the mobile computing device 102 of FIG. 1) of the user in block 420. To do so, the mobile computing device 102 must be in a proximity to the authentication computing device 106 relative to the short-range wireless communication technology employed by the authentication computing device 106 to facilitate wireless communication. In other words, the mobile computing device 102 must be close enough to the authentication computing device 106 such that they can connect via the short-range wireless communication technology used to couple the mobile computing device 102 and the authentication computing device 106. In this way, the authentication computing device 106 enforces a presence of the user (i.e., via the mobile computing device 102 of the user) relative to the authentication computing device 106.

In some embodiments, for example, the mobile computing device 102 and the authentication computing device 106 may utilize a first short-range wireless technology (e.g., a near field communication link) to initially establish a secure trust relationship between each other (e.g., to "bind" the mobile computing device 102 to the authentication computing device 106) and subsequently establish second short-range wireless technology (e.g., a Bluetooth® communication link) to transfer data between the mobile computing device 102 and the authentication computing device 106. In other embodiments, a single communication link (e.g., a Bluetooth® communication link) may be used to establish the trust relationship and facilitate the data transfer.

It should be appreciated that certain short-range wireless communication technologies may require additional input from the user, such as a pin code or passkey when pairing using Bluetooth® technology. It should be further appreciated that the authentication computing device 106 may be further configured to support receiving such input from the user to facilitate the coupling of the mobile computing device 102 and the authentication computing device 106. In block 422, the authentication computing device 106 establishes a secure communication channel with the mobile computing device 102 to securely transfer data therebetween.

In block 424, the authentication computing device 106 transmits the encrypted multi-factor authentication credential to the mobile computing device 102 with which the authentication computing device 106 is communicatively coupled. In block 426, the authentication computing device 106 determines whether an acknowledgment of receipt of the encrypted multi-factor authentication credential was received from the mobile computing device 102. If not, the method 400 loops back to block 426 to continue to determine whether the acknowledgment was received.

Otherwise, if the acknowledgment was received, the method 400 advances to block 428 in which the authentication computing device 106 stores one or more identifiers of the mobile computing device 102 (e.g., a machine access code (MAC) address of the mobile computing device 102 and/or other unique identifier of the mobile computing device 102) and/or information (e.g., pin code, passkey, etc.) related to the short-range wireless communication technology used to couple the mobile computing device 102 and the authentication computing device 106. It should be appreciated that such information may be used to communicatively couple the mobile computing device 102 and the authentication computing device 106 at a future point in time without requiring interaction from the user. From block 428, the method 400 returns to block 402 to determine whether enrollment of another mobile computing device 102 has been initiated.

Figure 5:
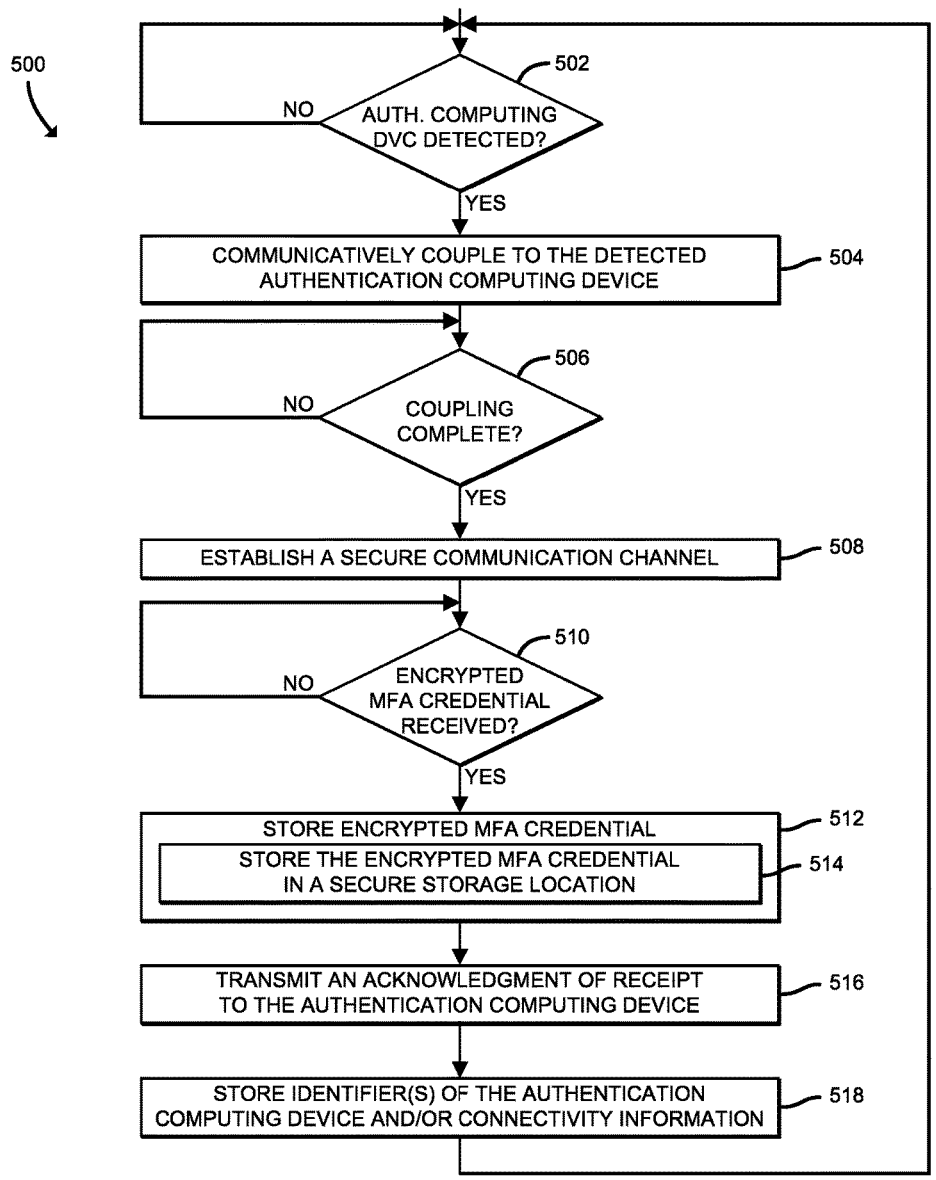
FIG. 5 is a simplified flow diagram of at least one embodiment of a method for enrolling the mobile computing device of FIGS. 1 and 2 that may be executed by the mobile computing device of FIGS. 1 and 2.

Referring now to FIG. 5, in use, the mobile computing device 102 may execute a method 500 for enrolling the mobile computing device 102 with an authentication computing device (e.g., the authentication computing device 106 of FIG. 1). The method 500 begins with block 502, in which the mobile computing device 102 determines whether the authentication computing device 106 has been detected. If not, the method loops back to block 502 to continue to monitor for the authentication computing device 106. Otherwise, if the authentication computing device 106 is detected, the method 500 advances to block 504, wherein the mobile computing device 102 communicatively couples to the authentication computing device 106 detected in block 502. For example, in embodiments wherein the coupling is performed using Bluetooth®, the mobile computing device 102 may pair with the authentication computing device 106.

In block 506, the mobile computing device 102 determines whether the coupling of the mobile computing device 102 and the authentication computing device 106 has completed. If not, the method 500 loops back to block 506, wherein the mobile computing device 102 continues to determine whether the coupling of the mobile computing device 102 and the authentication computing device 106 has completed. Otherwise, if the coupling of the mobile computing device 102 and the authentication computing device 106 has completed, the method 500 advances to block 508. In block 508, the mobile computing device 102 establishes a secure communication channel between the mobile computing device 102 and the authentication computing device 106 that is configured to securely transfer data therebetween.

In block 510, the mobile computing device 102 determines whether an encrypted multi-factor authentication credential has been received from the authentication computing device 106. If so, the method 500 advances to block 512 in which the mobile computing device 102 stores the encrypted multi-factor authentication credential received in block 510. For example, in block 514, the mobile computing device 102 may store the encrypted multi-factor authentication credential in a secure storage location of the mobile computing device 102.

Subsequently, in block 516, the mobile computing device 102 transmits an acknowledgment of receipt of the encrypted multi-factor authentication credential to the authentication computing device 106. In block 518, the mobile computing device 102 stores one or more identifiers of the authentication computing device 106 (e.g., a machine access code (MAC) address of the authentication computing device 106, an internet protocol (IP) address, and/or other unique identifier of the authentication computing device 106) and/or information (e.g., pin code, passkey, etc.) related to the short-range wireless communication technology used to couple the mobile computing device 102 and the authentication computing device 106. From block 518, the method 500 returns to block 502 to continue monitoring for another authentication computing device 106. It should be appreciated that such information may be used to communicatively couple the mobile computing device 102 and the authentication computing device 106 at a future point in time without requiring interaction from the user.

Figure 6:
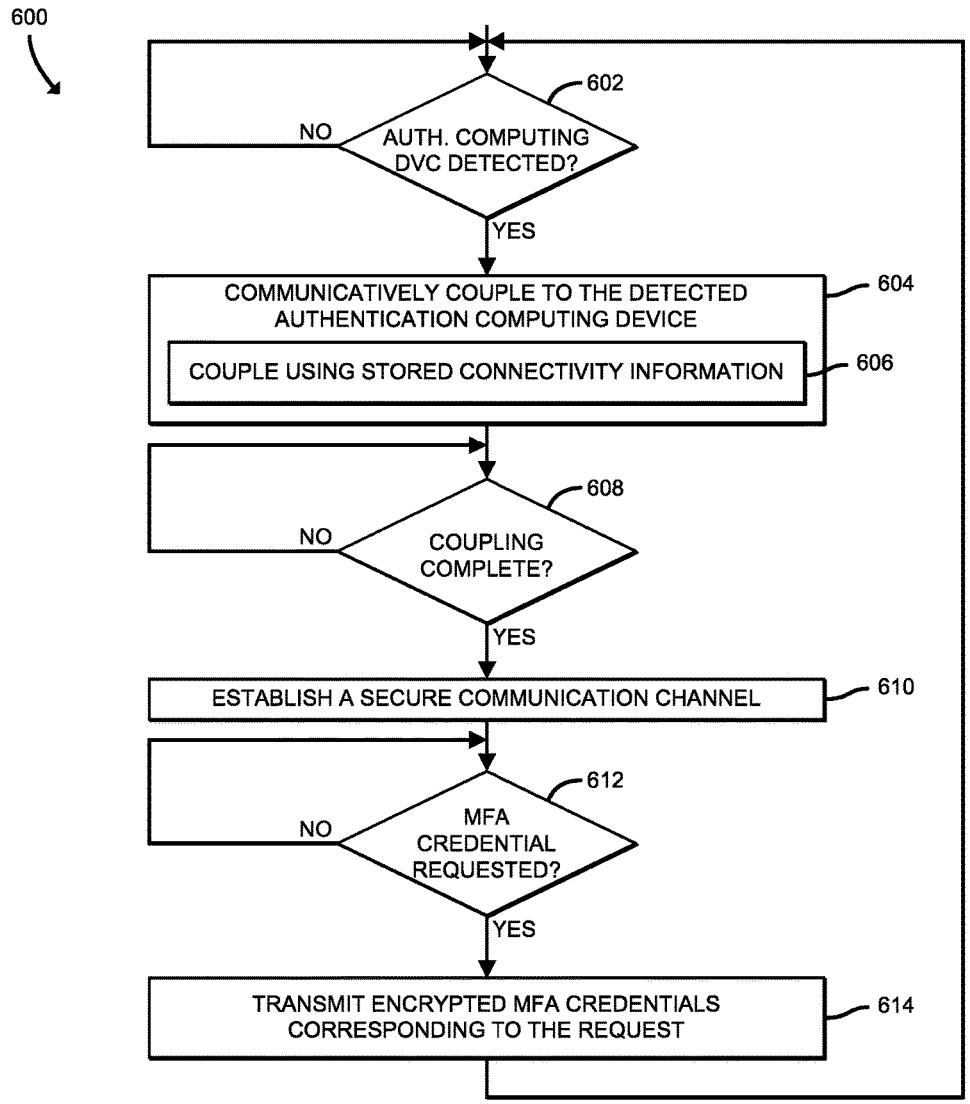
FIG. 6 is a simplified flow diagram of at least one embodiment of a method for performing a touch-free multi-factor authentication that may be executed by the mobile computing device of FIGS. 1 and 2.

Referring now to FIG. 6, in use, the mobile computing device 102 may execute a method 600 for performing a touch-free multi-factor authentication with an authentication computing device (e.g., the authentication computing device 106 of FIG. 1). The method 600 begins with block 602, in which the mobile computing device 102 determines whether the authentication computing device 106 has been detected. As described previously, detection of the authentication computing device 106 may be dependent on the proximity of the mobile computing device 102 to the authentication computing device 106 and the short-range wireless communication technology used to establish communication between the mobile computing device 102 and the authentication computing device 106. If the authentication computing device 106 has been detected, the method 600 advances to block 604 wherein the mobile computing device 102 communicatively couples to the authentication computing device 106 detected in block 602. To do so, in block 606, the mobile computing device 102 communicatively couples to the authentication computing device 106 using stored connectivity information (e.g., such as the connectivity information stored in block 418 of FIG. 4).

In 608, the mobile computing device 102 determines whether the coupling of the mobile computing device 102 and the authentication computing device 106 has completed. If so, the method 600 advances to block 610 in which the mobile computing device 102 establishes a secure communication channel between the mobile computing device 102 and the authentication computing device 106 that is configured to securely transfer data therebetween.

In block 612, the mobile computing device 102 determines whether a request for the encrypted multi-factor authentication credential (e.g., the encrypted multi-factor authentication credential transmitted previously to the mobile computing device 102) has been received from the authentication computing device 106. If so, the method 600 advances to block 614 in which the mobile computing device 102 transmits the encrypted multi-factor authentication credentials corresponding to the request received in block 612. From block 614, the method 600 returns to block 602, wherein the mobile computing device 102 continues to monitor for another authentication computing device 106.

Figure 7:
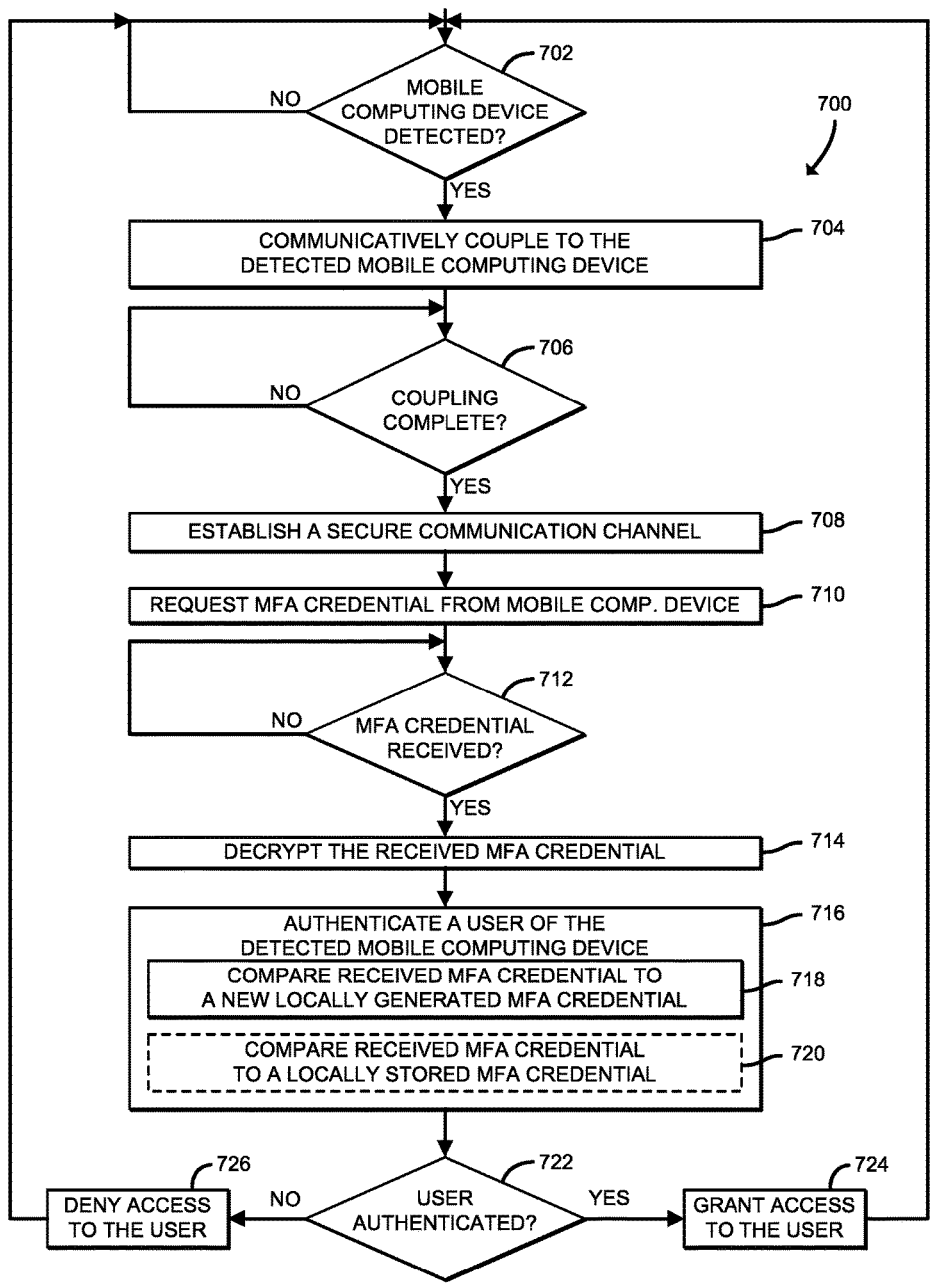
FIG. 7 is a simplified flow diagram of at least one embodiment of a method for performing a touch-free multi-factor authentication that may be executed by the authentication computing device of FIGS. 1 and 3.

Referring now to FIG. 7, in use, the authentication computing device 106 may execute a method 700 for performing a touch-free multi-factor authentication at the authentication computing device 106. The method 700 begins with block 702, in which the authentication computing device 106 determines whether a mobile computing device (e.g., the mobile computing device 102 of FIG. 1) has been detected in proximity of the authentication computing device 106. As described previously, the proximity may depend on the short-range wireless technology used to enroll the mobile computing device 102 with the authentication computing device 106 for the user (see, e.g., the method 400 of FIG. 4).

If the mobile computing device 102 was not detected, the method 700 loops back to block 702 to monitor for the mobile computing device 102. Otherwise, if the mobile computing device 102 has been detected in proximity of the authentication computing device 106, the method 700 advances to block 704. In block 704, the authentication computing device 106 communicatively couples to the mobile computing device 102 detected in block 702. For example, in embodiments wherein the coupling is performed using Bluetooth®, the authentication computing device 106 may pair with the mobile computing device 102, such as by using a pin code, a passkey, etc.

In block 706 the authentication computing device 106 determines whether it has communicatively coupled with the mobile computing device 102 detected in block 702. As described previously, in some embodiments, the authentication computing device 106 may determine whether the detected mobile computing device 102 was previously enrolled by verifying an identifier of the mobile computing device and/or connectivity information usable to establish the connectivity (i.e., using a short-range wireless technology) between the mobile computing device 102 and the authentication computing device 106. If the authentication computing device 106 has been communicatively coupled with the mobile computing device 102, the method 700 advances to block 708.

In block 708, the authentication computing device 106 establishes a secure communication channel between the authentication computing device 106 and the mobile computing device 102 that is configured to securely transfer data therebetween. In block 710, the authentication computing device 106 requests a multi-factor authentication credential from the mobile computing device 102 using the secure communication channel established in block 708. In block 712, the authentication computing device 106 determines whether the multi-factor authentication credential requested in block 710 was received from the mobile computing device 102. As described previously, the multi-factor authentication credential may be encrypted prior to being transmitted to the mobile computing device 102 during the enrollment of the mobile computing device (see, e.g., the method 400). Accordingly, in block 714, the authentication computing device 106 decrypts the multi-factor authentication credential received in block 708.

In block 714, the authentication computing device 106 authenticates the user of the mobile computing device 102 detected in block 702. To do so, in block 716, the authentication computing device 106 may authenticate the user based on an analysis of the multi-factor authentication credential decrypted in block 710.

In block 718, the authentication computing device 106 may compare the multi-factor authentication credential received in block 712 against a new locally generated multi-factor authentication credential. Accordingly, in such embodiments, the authentication computing device 106 may have prompted the user, such as upon detection of the mobile computing device 102, for example, to provide one or more biometric authentication factors, such as a fingerprint authentication factor, a retina authentication factor, a facial recognition authentication factor, a voice recognition authentication factor, etc., via the one or more biometric sensors (e.g., the biometric sensors 148 of FIG. 1) of the authentication computing device 106. It should be appreciated that, in such embodiments, the prompt may correspond to a determined biometric authentication factor of the multi-factor authentication credential received in block 712. Accordingly, the prompt may not be provided to the user until after the multi-factor authentication credential has been received in block 712 and decrypted in block 714.

Additionally, in some embodiments, in block 720, the authentication computing device 106 may compare the multi-factor authentication credential received in block 712 against a locally stored multi-factor authentication credential of the same type as the received multi-factor authentication credential as another authentication check. It should be appreciated that, in some embodiments, the stored multi-factor authentication credential may be stored and retrieved from a remotely located computing device or the received multi-factor authentication credential may be transmitted to the remotely located computing device for authentication.

In block 722, the authentication computing device 106 determines whether the user was authenticated based on a result of the authentication performed in block 716. If the user is authenticated, the method 700 branches to block 724. In block 724, the authentication computing device 106 grants access to the user to at least a portion of the authentication computing device 106 before the method 700 returns to block 702 to determine whether another mobile computing device 102 was detected. Otherwise, if the user is not authenticated, the method branches to block 726, wherein the authentication computing device 106 denies access to the user to the authentication computing device 106 before the method 700 returns to block 702 to determine whether another mobile computing device 102 was detected. In some embodiments, prior to returning to block 702 from block 726, the authentication computing device 106 may prompt the user for manual authentication (i.e., a manual login).

It should be appreciated that, in some embodiments, the methods 400 and 700 may be embodied as various instructions stored on a computer-readable media, which may be executed by the processor 130, the communication circuitry 142, and/or other components of the authentication computing device 106 to cause the authentication computing device 106 to perform the methods 400 and 700. The computer-readable media may be embodied as any type of media capable of being read by the authentication computing device 106 including, but not limited to, the memory 136, the data storage device 140, other memory or data storage devices of the authentication computing device 106, portable media readable by a peripheral device of the authentication computing device 106, and/or other media.

Similarly, it should also be appreciated that, in some embodiments, the methods 500 and 600 may be embodied as various instructions stored on a computer-readable media, which may be executed the processor 110, the communication circuitry 122, and/or other components of the mobile computing device 102 to cause the mobile computing device 102 to perform the methods 500 and 600. The computer-readable media may be embodied as any type of media capable of being read by the mobile computing device 102 including, but not limited to, the memory 116, the data storage device 120, other memory or data storage devices of the mobile computing device 102, portable media readable by a peripheral device of the mobile computing device 102, and/or other media.

EXAMPLES

Illustrative examples of the technologies disclosed herein are provided below. An embodiment of the technologies may include any one or more, and any combination of, the examples described below.

Example 1 includes an authentication computing device for authenticating a user at the authentication computing device, the authentication computing device comprising wireless communication module to receive a multi-factor authentication credential from a mobile computing device associated with a user, wherein the mobile computing device is communicatively coupled to the authentication computing device via a wireless communication channel, wherein the multi-factor authentication credential includes a text-based credential and one or more biometric authentication factors, each of the one or more biometric authentication factors corresponding to the user established during an enrollment of the mobile computing device at the authentication computing device; and authentication attempt execution module to (i) analyze the received multi-factor authentication credential to determine whether the user is an authorized user of the authentication computing device and (ii) grant, in response to a determination that the multi-factor authentication credential corresponds to the authorized user, the user access to at least a portion of the authentication computing device.

Example 2 includes the subject matter of Example 1, and further including multi-factor authentication credential enrollment module to (i) request the user to provide one or more biometric authentication factors corresponding to the one or more biometric authentication factors of the received multi-factor authentication credential and (ii) generate another multi-factor authentication credential including the one or more provided biometric authentication factors.

Example 3 includes the subject matter of any of Examples 1 and 2, and wherein to analyze the received multi-factor authentication credential comprises to compare the received multi-factor authentication credential to the other multi-factor authentication credential.

Example 4 includes the subject matter of any of Examples 1-3, and wherein to analyze the received multi-factor authentication credential further comprises to compare the received multi-factor authentication credential to a verified credential of the user of the mobile computing device stored on the authentication computing device and established during the enrollment of the mobile computing device at the authentication computing device.

Example 5 includes the subject matter of any of Examples 1-4, and further including trusted execution support module to establish a trusted execution environment on the authentication computing device, wherein to analyze the received multi-factor authentication credential comprises to analyze the received multi-factor authentication credential within the trusted execution environment.

Example 6 includes the subject matter of any of Examples 1-5, and wherein the trusted execution environment comprises a secure enclave or a virtualized environment.

Example 7 includes the subject matter of any of Examples 1-6, and wherein the wireless communication module is further to (i) receive an indication that indicates the mobile computing device is within a proximity of the authentication computing device, (ii) establish, subsequent to receiving the indication, a secure communication channel to securely transmit and receive data between the authentication computing device and the mobile computing device, and (iii) transmit the multi-factor authentication credential to the mobile computing device via the secure communication channel.

Example 8 includes the subject matter of any of Examples 1-7, and further including multi-factor authentication credential enrollment module to (i) request the user to manually input the text-based credential and the one or more biometric authentication factors and (ii) generate the multi-factor authentication credential including the text-based credential and the one or more biometric authentication factors.

Example 9 includes the subject matter of any of Examples 1-8, and wherein the multi-factor authentication credential enrollment module is further to encrypt the multi-factor authentication credential, wherein to transmit the multi-factor authentication credential to the mobile computing device comprises to transmit the encrypted multi-factor authentication credential to the mobile computing device.

Example 10 includes the subject matter of any of Examples 1-9, and wherein the authentication attempt execution module is further to (i) request the encrypted multi-factor authentication credential from the mobile computing device and (ii) receive, subsequent to requesting the encrypted multi-factor authentication credential, the encrypted multi-factor authentication credential from the mobile computing device, and (iii) decrypt, prior to having analyzed the encrypted multi-factor authentication credential, the encrypted multi-factor authentication credential.

Example 11 includes the subject matter of any of Examples 1-10, and wherein the wireless communication module is further to establish another secure communication channel to securely transmit and receive data between the authentication computing device and the mobile computing device, wherein to receive the encrypted multi-factor authentication credential from the mobile computing device comprises to receive the encrypted multi-factor authentication credential from the mobile computing device via the other secure communication channel.

Example 12 includes a method for authenticating a user at an authentication computing device, the method comprising receiving, by the authentication computing device, a multi-factor authentication credential from a mobile computing device associated with a user, wherein the mobile computing device is communicatively coupled to the authentication computing device via a wireless communication channel, wherein the multi-factor authentication credential includes a text-based credential and one or more biometric authentication factors, each of the one or more biometric authentication factors corresponding to the user established during an enrollment of the mobile computing device at the authentication computing device; analyzing, by the authentication computing device, the received multi-factor authentication credential to determine whether the user is an authorized user of the authentication computing device; and granting, by the authentication computing device and in response to a determination that the multi-factor authentication credential corresponds to the authorized user, the user access to at least a portion of the authentication computing device.

Example 13 includes the subject matter of Example 12, and further including requesting, by the authentication computing device, the user to provide one or more biometric authentication factors corresponding to the one or more biometric authentication factors of the received multi-factor authentication credential; and generating, by the authentication computing device, another multi-factor authentication credential including the one or more provided biometric authentication factors.

Example 14 includes the subject matter of any of Examples 12 and 13, and wherein analyzing the received multi-factor authentication credential comprises comparing the received multi-factor authentication credential to the other multi-factor authentication credential.

Example 15 includes the subject matter of any of Examples 12-14, and wherein analyzing the received multi-factor authentication credential further comprises comparing the received multi-factor authentication credential to a verified credential of the user of the mobile computing device stored on the authentication computing device and established during the enrollment of the mobile computing device at the authentication computing device.

Example 16 includes the subject matter of any of Examples 12-15, and further including establishing, by the authentication computing device, a trusted execution environment on the authentication computing device, wherein analyzing the received multi-factor authentication credential comprises analyzing the received multi-factor authentication credential within the trusted execution environment.

Example 17 includes the subject matter of any of Examples 12-16, and wherein analyzing the received multi-factor authentication credential within the trusted execution environment comprises analyzing the received multi-factor authentication credential within one of a secure enclave or a virtualized environment.

Example 18 includes the subject matter of any of Examples 12-17, and further including receiving, by the authentication computing device, an indication that indicates the mobile computing device is within a proximity of the authentication computing device; establishing, by the authentication computing device and subsequent to receiving the indication, a secure communication channel to securely transmit and receive data between the authentication computing device and the mobile computing device; and transmitting, by the authentication computing device, the multi-factor authentication credential to the mobile computing device via the secure communication channel.

Example 19 includes the subject matter of any of Examples 12-18, and further including requesting, by the authentication computing device, the user to manually input the text-based credential and the one or more biometric authentication factors; and generating, by the authentication computing device, the multi-factor authentication credential including the text-based credential and the one or more biometric authentication factors.

Example 20 includes the subject matter of any of Examples 12-19, and further including encrypting the multi-factor authentication credential, wherein transmitting the multi-factor authentication credential to the mobile computing device comprises transmitting the encrypted multi-factor authentication credential to the mobile computing device.

Example 21 includes the subject matter of any of Examples 12-20, and further including requesting, by the authentication computing device, the encrypted multi-factor authentication credential from the mobile computing device; receive, by the authentication computing device and subsequent to requesting the encrypted multi-factor authentication credential, the encrypted multi-factor authentication credential from the mobile computing device; and decrypting, by the authentication computing device and prior to having analyzed the encrypted multi-factor authentication credential, the encrypted multi-factor authentication credential.

Example 22 includes the subject matter of any of Examples 12-21, and further including establishing, by the authentication computing device, another secure communication channel to securely transmit and receive data between the authentication computing device and the mobile computing device, wherein receiving the encrypted multi-factor authentication credential from the mobile computing device comprises receiving the encrypted multi-factor authentication credential from the mobile computing device via the other secure communication channel.

Example 23 includes an authentication computing device comprising a processor; and a memory having stored therein a plurality of instructions that when executed by the processor cause the authentication computing device to perform the method of any of Examples 12-22.

Example 24 includes one or more machine readable storage media comprising a plurality of instructions stored thereon that in response to being executed result in an authentication computing device performing the method of any of Examples 12-22.

Example 25 includes a mobile computing device for authenticating a user at an authentication computing device via touch-free multi-factor authentication, the mobile computing device comprising wireless communication module to receive a multi-factor authentication credential from an authentication computing device communicatively coupled via a wireless communication channel to the mobile computing device, wherein the multi-factor authentication credential includes a text-based credential and one or more biometric authentication factors, wherein each of the text-based credential and the one or more biometric authentication factors correspond to a user of the mobile computing device; and secure credential storage management module to store the received multi-factor authentication credential, wherein the wireless communication module is further to (i) receive a multi-factor authentication credential request from the authentication computing device and (ii) transmit the stored multi-factor authentication credential in response to the multi-factor authentication credential request.

Example 26 includes the subject matter of Example 25, and wherein the wireless communication module is further to (i) determine whether the authentication computing device is within a proximity of the mobile computing device and (ii) establish, in response to a determination that the authentication computing device is within the proximity, a secure communication channel with the mobile computing device to securely transmit and receive data between the authentication computing device and the mobile computing device.

Example 27 includes the subject matter of any of Examples 25 and 26, and wherein to determine whether the authentication computing device is within the proximity of the mobile computing device comprises to determine whether the mobile computing device is within a wireless communication range of the authentication computing device, wherein the wireless communication range identifies a signal range of a short-range wireless communication technology.

Example 28 includes the subject matter of any of Examples 25-27, and wherein to receive the multi-factor authentication credential comprises to receive the multi-factor authentication credential via the secure communication channel.

Example 29 includes the subject matter of any of Examples 25-28, and wherein to transmit the multi-factor authentication credential comprises to transmit the multi-factor authentication credential via the secure communication channel.

Example 30 includes the subject matter of any of Examples 25-29, and wherein to receive the multi-factor authentication credential comprises to receive the multi-factor authentication credential from a first authentication computing device, wherein to receive the multi-factor authentication credential comprises to receive the multi-factor authentication credential from a second authentication computing device, and wherein to transmit the multi-factor authentication credential comprises to transmit the multi-factor authentication credential to the second authentication computing device.

Example 31 includes the subject matter of any of Examples 25-30, and wherein to store the received multi-factor authentication credential comprises to store the received multi-factor authentication credential in a secure storage of the mobile computing device.

Example 32 includes a method for authenticating a user at a computing device via touch-free multi-factor authentication, the method comprising receiving, by a mobile computing device, a multi-factor authentication credential from an authentication computing device communicatively coupled via a wireless communication channel to the mobile computing device, wherein the multi-factor authentication credential includes a username, a password, and one or more biometric authentication factors, wherein each of the username, the password, and the one or more biometric authentication factors correspond to a user of the mobile computing device; storing, by the mobile computing device, the received multi-factor authentication credential; receiving, by the mobile computing device, an multi-factor authentication credential from the authentication computing device; and transmitting, by the mobile computing device, the stored multi-factor authentication credential in response to the multi-factor authentication credential.

Example 33 includes the subject matter of Examples 32, and further including determining, by the mobile computing device, whether the authentication computing device is within a proximity of the mobile computing device; and establishing, by the mobile computing device and in response to a determination that the authentication computing device is within the proximity, a secure communication channel with the mobile computing device to securely transmit and receive data between the authentication computing device and the mobile computing device.

Example 34 includes the subject matter of any of Examples 32 and 33, and wherein to determine whether the authentication computing device is within the proximity of the mobile computing device comprises to determine whether the mobile computing device is within a wireless communication range of the authentication computing device, wherein the wireless communication range identifies a signal range of a short-range wireless communication technology.

Example 35 includes the subject matter of any of Examples 32-34, and wherein receiving the multi-factor authentication credential comprises receiving the multi-factor authentication credential via the secure communication channel.

Example 36 includes the subject matter of any of Examples 32-35, and wherein transmitting the multi-factor authentication credential comprises transmitting the multi-factor authentication credential via the secure communication channel.

Example 37 includes the subject matter of any of Examples 32-36, and wherein receiving the multi-factor authentication credential comprises receiving the multi-factor authentication credential from a first authentication computing device, wherein receiving the multi-factor authentication credential comprises receiving the multi-factor authentication credential from a second authentication computing device, and wherein transmitting the multi-factor authentication credential comprises transmitting the multi-factor authentication credential to the second authentication computing device.

Example 38 includes the subject matter of any of Examples 32-37, and wherein storing the received multi-factor authentication credential comprises storing the received multi-factor authentication credential in a secure storage of the mobile computing device.

Example 39 includes a computing device comprising a processor; and a memory having stored therein a plurality of instructions that when executed by the processor cause the computing device to perform the method of any of Examples 32-38.

Example 40 includes one or more machine readable storage media comprising a plurality of instructions stored thereon that in response to being executed result in a computing device performing the method of any of Examples 32-38

Example 41 includes an authentication computing device for authenticating a user at the authentication computing device, the authentication computing device comprising means for receiving a multi-factor authentication credential from a mobile computing device associated with a user, wherein the mobile computing device is communicatively coupled to the authentication computing device via a wireless communication channel, wherein the multi-factor authentication credential includes a text-based credential and one or more biometric authentication factors, each of the one or more biometric authentication factors corresponding to the user established during an enrollment of the mobile computing device at the authentication computing device; means for analyzing the received multi-factor authentication credential to determine whether the user is an authorized user of the authentication computing device; and means for granting, in response to a determination that the multi-factor authentication credential corresponds to the authorized user, the user access to at least a portion of the authentication computing device.

Example 42 includes the subject matter of Example 41, and further including means for requesting the user to provide one or more biometric authentication factors corresponding to the one or more biometric authentication factors of the received multi-factor authentication credential; and means for generating another multi-factor authentication credential including the one or more provided biometric authentication factors.

Example 43 includes the subject matter of any of Examples 41 and 42, and wherein the means for analyzing the received multi-factor authentication credential comprises means for comparing the received multi-factor authentication credential to the other multi-factor authentication credential.

Example 44 includes the subject matter of any of Examples 41-43, and wherein the means for analyzing the received multi-factor authentication credential further comprises means for comparing the received multi-factor authentication credential to a verified credential of the user of the mobile computing device stored on the authentication computing device and established during the enrollment of the mobile computing device at the authentication computing device.

Example 45 includes the subject matter of any of Examples 41-44, and further including means for establishing a trusted execution environment on the authentication computing device, wherein the means for analyzing the received multi-factor authentication credential comprises means for analyzing the received multi-factor authentication credential within the trusted execution environment.

Example 46 includes the subject matter of any of Examples 41-45, and wherein the means for analyzing the received multi-factor authentication credential within the trusted execution environment comprises means for analyzing the received multi-factor authentication credential within one of a secure enclave or a virtualized environment.

Example 47 includes the subject matter of any of Examples 41-46, and wherein the means for receiving comprises means for (i) receiving an indication that indicates the mobile computing device is within a proximity of the authentication computing device, (ii) establishing, subsequent to receiving the indication, a secure communication channel to securely transmit and receive data between the authentication computing device and the mobile computing device, and (iii) transmitting the multi-factor authentication credential to the mobile computing device via the secure communication channel.

Example 48 includes the subject matter of any of Examples 41-47, and further including means for requesting the user to manually input the text-based credential and the one or more biometric authentication factors; and means for generating the multi-factor authentication credential including the text-based credential and the one or more biometric authentication factors.

Example 49 includes the subject matter of any of Examples 41-48, and further including means for encrypting the multi-factor authentication credential and means for transmitting the encrypted multi-factor authentication credential to the mobile computing device.

Example 50 includes the subject matter of any of Examples 41-49, and wherein the means for receiving comprises means for requesting the encrypted multi-factor authentication credential from the mobile computing device and (ii) means for receiving, subsequent to requesting the encrypted multi-factor authentication credential, the encrypted multi-factor authentication credential from the mobile computing device, and further comprising means for decrypting, prior to having analyzed the encrypted multi-factor authentication credential, the encrypted multi-factor authentication credential.

Example 51 includes the subject matter of any of Examples 41-50, and further including means for establishing another secure communication channel to securely transmit and receive data between the authentication computing device and the mobile computing device, wherein the means for receiving the encrypted multi-factor authentication credential from the mobile computing device comprises means for receiving the encrypted multi-factor authentication credential from the mobile computing device via the other secure communication channel.

Example 52 includes a mobile computing device for authenticating a user at an authentication computing device via touch-free multi-factor authentication, the mobile computing device comprising means for receiving a multi-factor authentication credential from an authentication computing device communicatively coupled via a wireless communication channel to the mobile computing device, wherein the multi-factor authentication credential includes a username, a password, and one or more biometric authentication factors, wherein each of the username, the password, and the one or more biometric authentication factors correspond to a user of the mobile computing device; and means for storing the received multi-factor authentication credential, wherein the means for receiving comprises means for (i) receiving a multi-factor authentication credential from the authentication computing device and (ii) transmitting the stored multi-factor authentication credential in response to the multi-factor authentication credential.

Example 53 includes the subject matter of Example 52, and further including wherein the means for receiving comprises means for (i) determining whether the authentication computing device is within a proximity of the mobile computing device and (ii) establishing, in response to a determination that the authentication computing device is within the proximity, a secure communication channel with the mobile computing device to securely transmit and receive data between the authentication computing device and the mobile computing device.

Example 54 includes the subject matter of any of Examples 52 and 53, and wherein to determine whether the authentication computing device is within the proximity of the mobile computing device comprises to determine whether the mobile computing device is within a wireless communication range of the authentication computing device, wherein the wireless communication range identifies a signal range of a short-range wireless communication technology.

Example 55 includes the subject matter of any of Examples 52-54, and wherein to receive the multi-factor authentication credential comprises to receive the multi-factor authentication credential via the secure communication channel.

Example 56 includes the subject matter of any of Examples 52-55, and wherein to transmit the multi-factor authentication credential comprises to transmit the multi-factor authentication credential via the secure communication channel.

Example 57 includes the subject matter of any of Examples 52-56, and wherein to receive the multi-factor authentication credential comprises to receive the multi-factor authentication credential from a first authentication computing device, wherein to receive the multi-factor authentication credential comprises to receive the multi-factor authentication credential from a second authentication computing device, and wherein to transmit the multi-factor authentication credential comprises to transmit the multi-factor authentication credential to the second authentication computing device.

Example 58 includes the subject matter of any of Examples 52-57, and wherein the means for storing the received multi-factor authentication credential comprises means for storing the received multi-factor authentication credential in a secure storage of the mobile computing device.

The invention claimed is:

1. An authentication computing device for authenticating a user at the authentication computing device, the authentication computing device comprising:
   one or more processors; and
   one or more memory devices having stored therein a plurality of instructions, which when executed by the one or more processors, cause the authentication computing device to:
   (i) request the user to manually input a text-based credential and one or more biometric authentication factors, wherein each of the one or more biometric authentication factors corresponds to the user;
   (ii) generate a multi-factor authentication credential that includes the text-based credential and the one or more biometric authentication factors;
   (iii) encrypt the multi-factor authentication credential to produce an encrypted multi-factor authentication credential;
   (iv) receive an indication that indicates the mobile computing device is within a proximity of the authentication computing device;
   (v) establish, subsequent to receiving the indication, a secure communication channel to securely transmit and receive data between the authentication computing device and the mobile computing device;
   (vi) transmit the multi-factor authentication credential to the mobile computing device via the secure communication channel;
   (vii) determine, subsequent to the transmission of the multi-factor authentication credential to the mobile computing device, whether the mobile computing device associated with the user is within a reference proximity of the authentication computing device,
   (viii) automatically request the encrypted multi-factor authentication credential from the mobile computing device in response to a determination that the mobile computing device is within the reference proximity;
   (viv) receive the encrypted multi-factor authentication credential from the mobile computing device in response to the request;
   (vv) analyze the received encrypted multi-factor authentication credential to determine whether the user is an authorized user of the authentication computing device, and
   (vvi) grant, in response to a determination that the encrypted multi-factor authentication credential corresponds to the authorized user, the user access to at least a portion of the authentication computing device.

2. The authentication computing device of claim 1, wherein the plurality of instructions, when executed, further cause the authentication computing device to (i) request the user to provide one or more biometric authentication factors corresponding to the one or more biometric authentication factors of the received encrypted multi-factor authentication credential and (ii) generate another multi-factor authentication credential including the one or more provided biometric authentication factors.

3. The authentication computing device of claim 2, wherein to analyze the received multi-factor authentication credential comprises to compare the received multi-factor authentication credential to the other multi-factor authentication credential.

4. The authentication computing device of claim 1, wherein the plurality of instructions, when executed, further cause the authentication computing device to establish a trusted execution environment on the authentication computing device, wherein to analyze the received multi-factor authentication credential comprises to analyze the received multi-factor authentication credential within the trusted execution environment.

5. The authentication computing device of claim 1, wherein the plurality of instructions, when executed, further cause the authentication computing device to encrypt the multi-factor authentication credential, wherein to transmit the multi-factor authentication credential to the mobile computing device comprises to transmit the encrypted multi-factor authentication credential to the mobile computing device.

6. The authentication computing device of claim 5, wherein the plurality of instructions, when executed, further cause the authentication computing device to (i) request the encrypted multi-factor authentication credential from the mobile computing device and (ii) receive, subsequent to requesting the encrypted multi-factor authentication credential, the encrypted multi-factor authentication credential from the mobile computing device, and (iii) decrypt, prior to having analyzed the encrypted multi-factor authentication credential, the encrypted multi-factor authentication credential.

7. The authentication computing device of claim 6, wherein the plurality of instructions, when executed, further cause the authentication computing device to establish another secure communication channel to securely transmit and receive data between the authentication computing device and the mobile computing device, wherein to receive the encrypted multi-factor authentication credential from the mobile computing device comprises to receive the encrypted multi-factor authentication credential from the mobile computing device via the other secure communication channel.

8. One or more non-transitory, computer-readable storage media comprising a plurality of instructions stored thereon that in response to being executed cause the authentication computing device to:
  request a user to manually input a text-based credential and one or more biometric authentication factors, wherein each of the one or more biometric authentication factors corresponds to the user;
  generate a multi-factor authentication credential that includes the text-based credential and the one or more biometric authentication factors;
  encrypt the multi-factor authentication credential to produce an encrypted multi-factor authentication credential;
  provide the encrypted multi-factor authentication credential to a mobile computing device associated with a user;
  receive an indication that indicates the mobile computing device is within a proximity of the authentication computing device;
  establish, subsequent to receiving the indication, a secure communication channel to securely transmit and receive data between the authentication computing device and the mobile computing device;
  transmit the multi-factor authentication credential to the mobile computing device via the secure communication channel;
  determine, subsequent to the transmission of the multi-factor authentication credential to the mobile computing device, whether the mobile computing device associated with the user is within a reference proximity of the authentication computing device;
  automatically request the encrypted multi-factor authentication credential from the mobile computing device in response to a determination that the mobile computing device is within the reference proximity;
  receive the encrypted multi-factor authentication credential from a mobile computing device in response to the request;
  analyze the received encrypted multi-factor authentication credential to determine whether the user is an authorized user of the authentication computing device; and
  grant, in response to a determination that the encrypted multi-factor authentication credential corresponds to the authorized user, the user access to at least a portion of the authentication computing device.

9. The one or more non-transitory, computer-readable storage media of claim 8, further comprising a plurality of instructions that in response to being executed cause the authentication computing device to:
  request the user to provide one or more biometric authentication factors corresponding to the one or more biometric authentication factors of the received multi-factor authentication credential; and
  generate another multi-factor authentication credential including the one or more provided biometric authentication factors.

10. The one or more non-transitory, computer-readable storage media of claim 9, wherein to analyze the received multi-factor authentication credential comprises to compare the received multi-factor authentication credential to the other multi-factor authentication credential.

11. The one or more non-transitory, computer-readable storage media of claim 8, further comprising a plurality of instructions that in response to being executed cause the authentication computing device to establish a trusted execution environment on the authentication computing device, wherein to analyze the received multi-factor authentication credential comprises to analyze the received multi-factor authentication credential within the trusted execution environment.

12. The one or more non-transitory, computer-readable storage media of claim 8, further comprising a plurality of instructions that in response to being executed cause the authentication computing device to encrypt the multi-factor authentication credential, wherein to transmit the multi-factor authentication credential to the mobile computing device comprises to transmit the encrypted multi-factor authentication credential to the mobile computing device.

13. The one or more non-transitory, computer-readable storage media of claim 12, further comprising a plurality of instructions that in response to being executed cause the authentication computing device to:
  request the encrypted multi-factor authentication credential from the mobile computing device;
  receive, subsequent to requesting the encrypted multi-factor authentication credential, the encrypted multi-factor authentication credential from the mobile computing device; and
  decrypt, prior to having analyzed the encrypted multi-factor authentication credential, the encrypted multi-factor authentication credential.

14. The one or more non-transitory, computer-readable storage media of claim 13, further comprising a plurality of instructions that in response to being executed cause the authentication computing device to establish another secure communication channel to securely transmit and receive data between the authentication computing device and the mobile computing device, wherein to receive the encrypted multi-factor authentication credential from the mobile computing device comprises to receive the encrypted multi-factor authentication credential from the mobile computing device via the other secure communication channel.

15. A method for authenticating a user at an authentication computing device, the method comprising:
- requesting, by the authentication computing device, the user to manually input a text-based credential and one or more biometric authentication factors, wherein each of the one or more biometric authentication factors corresponds to the user;
- generating, by the authentication computing device, a multi-factor authentication credential that includes the text-based credential and the one or more biometric authentication factors;
- encrypting, by the authentication computing device, the multi-factor authentication credential to produce an encrypted multi-factor authentication credential;
- receiving an indication that indicates the mobile computing device is within a proximity of the authentication computing device;
- establishing, subsequent to receiving the indication, a secure communication channel to securely transmit and receive data between the authentication computing device and the mobile computing device;
- transmitting the multi-factor authentication credential to the mobile computing device via the secure communication channel;
- determining, by the authentication computing device and subsequent to transmitting the multi-factor authentication credential to the mobile computing device, whether the mobile computing device associated with the user is within a reference proximity of the authentication computing device;
- requesting automatically, by the authentication computing device, the encrypted multi-factor authentication credential from the mobile computing device in response to a determination that the mobile computing device is within the reference proximity;
- receiving, by the authentication computing device, the encrypted multi-factor authentication credential from the mobile computing device in response to the request;
- analyzing, by the authentication computing device, the received encrypted multi-factor authentication credential to determine whether the user is an authorized user of the authentication computing device; and
- granting, by the authentication computing device and in response to a determination that the encrypted multi-factor authentication credential corresponds to the authorized user, the user access to at least a portion of the authentication computing device.

16. The method of claim 15, further comprising:
- requesting, by the authentication computing device, the user to provide one or more biometric authentication factors corresponding to the one or more biometric authentication factors of the received multi-factor authentication credential; and
- generating, by the authentication computing device, another multi-factor authentication credential including the one or more provided biometric authentication factors, wherein analyzing the received multi-factor authentication credential comprises comparing the received multi-factor authentication credential to the other multi-factor authentication credential.

17. The method of claim 15, establishing, by the authentication computing device, a trusted execution environment on the authentication computing device, wherein analyzing the received multi-factor authentication credential comprises analyzing the received multi-factor authentication credential within the trusted execution environment.

18. The method of claim 15, further comprising encrypting the multi-factor authentication credential, wherein transmitting the multi-factor authentication credential to the mobile computing device comprises transmitting the encrypted multi-factor authentication credential to the mobile computing device.

19. The method of claim 18, further comprising:
- requesting, by the authentication computing device, the encrypted multi-factor authentication credential from the mobile computing device;
- receiving, by the authentication computing device and subsequent to requesting the encrypted multi-factor authentication credential, the encrypted multi-factor authentication credential from the mobile computing device; and
- decrypting, by the authentication computing device and prior to having analyzed the encrypted multi-factor authentication credential, the encrypted multi-factor authentication credential.

* * * * *